July 15, 1958

H. W. ROEBER 2,843,272

TUBE TRANSFER MECHANISM

Filed Oct. 3, 1955

INVENTOR.
HENRY W. ROEBER
BY
Michael Hertz

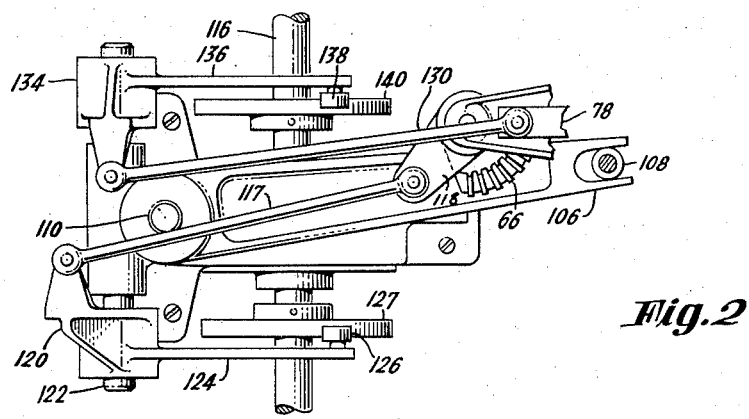
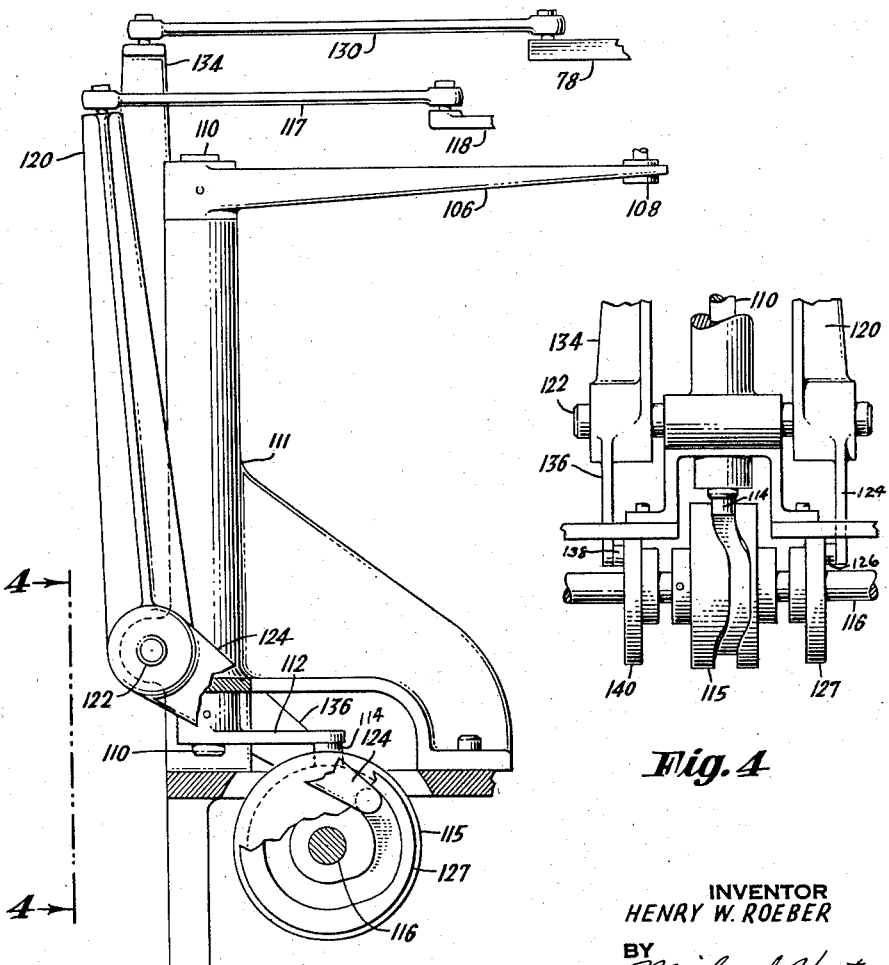

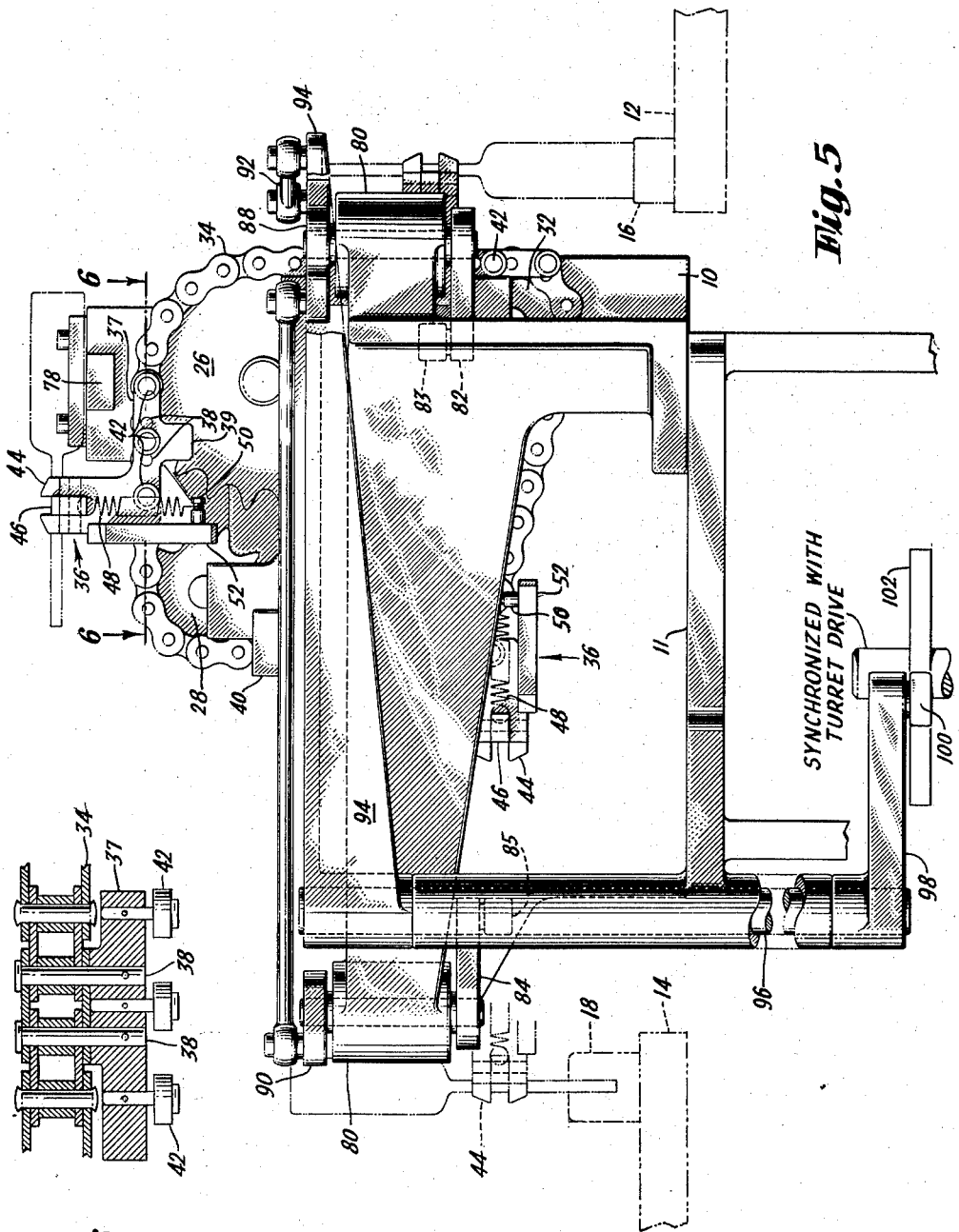

July 15, 1958  H. W. ROEBER  2,843,272
TUBE TRANSFER MECHANISM
Filed Oct. 3, 1955  5 Sheets-Sheet 5

INVENTOR.
HENRY W. ROEBER
BY Michael Hertz

United States Patent Office 2,843,272
Patented July 15, 1958

2,843,272

TUBE TRANSFER MECHANISM

Henry W. Roeber, Emporium, Pa., assignor to Sylvania Electric Products Inc., a corporation of Massachusetts Application October 3, 1955, Serial No. 538,044

10 Claims. (Cl. 214—1)

This invention relates to transfer mechanism for transferring a partially processed electron tube from one machine to another.

In one type of tube manufacturing equipment there is provided a turret provided with pegs on which stems provided with electrodes are positioned. A glass bulb is associated with each stem and then gas flames around the circumference of the turret operate to seal the bulbs to the stems as the pegs are revolved and the turret indexes. Each bulb is provided at the upper portion with a glass exhaust tubulation. After sealing, the associated stem and bulb, now joined to form a tube, is transferred to another adjoining turret type machine provided with exhaust ports into each of which the exhaust tubulation of an associated bulb and stem is thrust. On this second turret the tube is exhausted while the electrode elements are properly processed, and finally the exhaust tubulation is fused and the bulb tipped off.

Previous to this invention, the transfer of tubes from the sealing mechanism to the adjoining processing mechanism was effected by hand operation. With this invention it is possible to accomplish the transfer automatically leaving the operator, who normally would have performed the function of transferring tubes from one mechanism to another, free to perform other duties on the adjoining portions of the equipment.

Accordingly, it is an object of this invention to provide mechanism to transfer partially processed electron tubes from one portion of electron tube manufacturing equipment to another, as from one turret to another.

It is another object of the invention to synchronize the movements of the two adjoining turrets and the transfer mechanism to insure proper operation of the transfer mechanism.

It is a still further object of the invention to provide for a simple mechanism to effect the transfer and yet another which is reliable in operation.

These and other objects will become apparent after reading the following specification and claims when taken in conjunction with the accompanying drawings, in which:

Fig. 2 shows a portion of the mechanism employed to shift a transfer carriage from one turret to the other and to operate mechanism in the carriage.

Fig. 3 is a side view of the mechanism shown in Fig. 2.

Fig. 4 is a rear view of the same mechanism looking in the direction of the arrows 4—4 of Fig. 3.

Fig. 5 is a side view of the tube transfer carriage and also adjacent means to operate the tube engaging jaws.

Fig. 6 is a section on the line 6—6 of Fig. 5.

Figure 1:
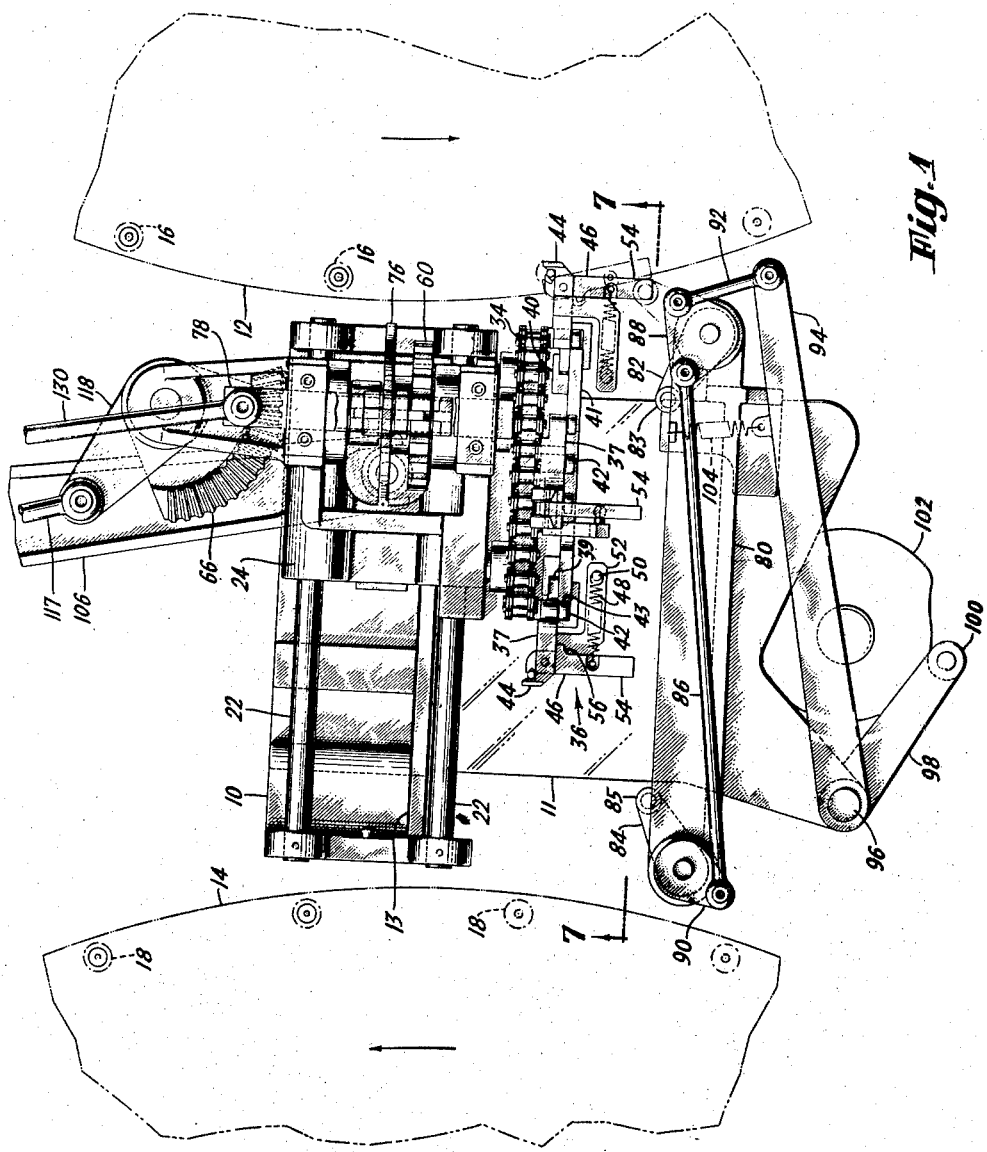
Fig. 1 is a plan view of the transfer mechanism showing its relation to the bulb sealing and tube exhausting turrets and showing a carriage provided with a travelling chain carrying exhaust tube engaging jaws.
Figure 7:
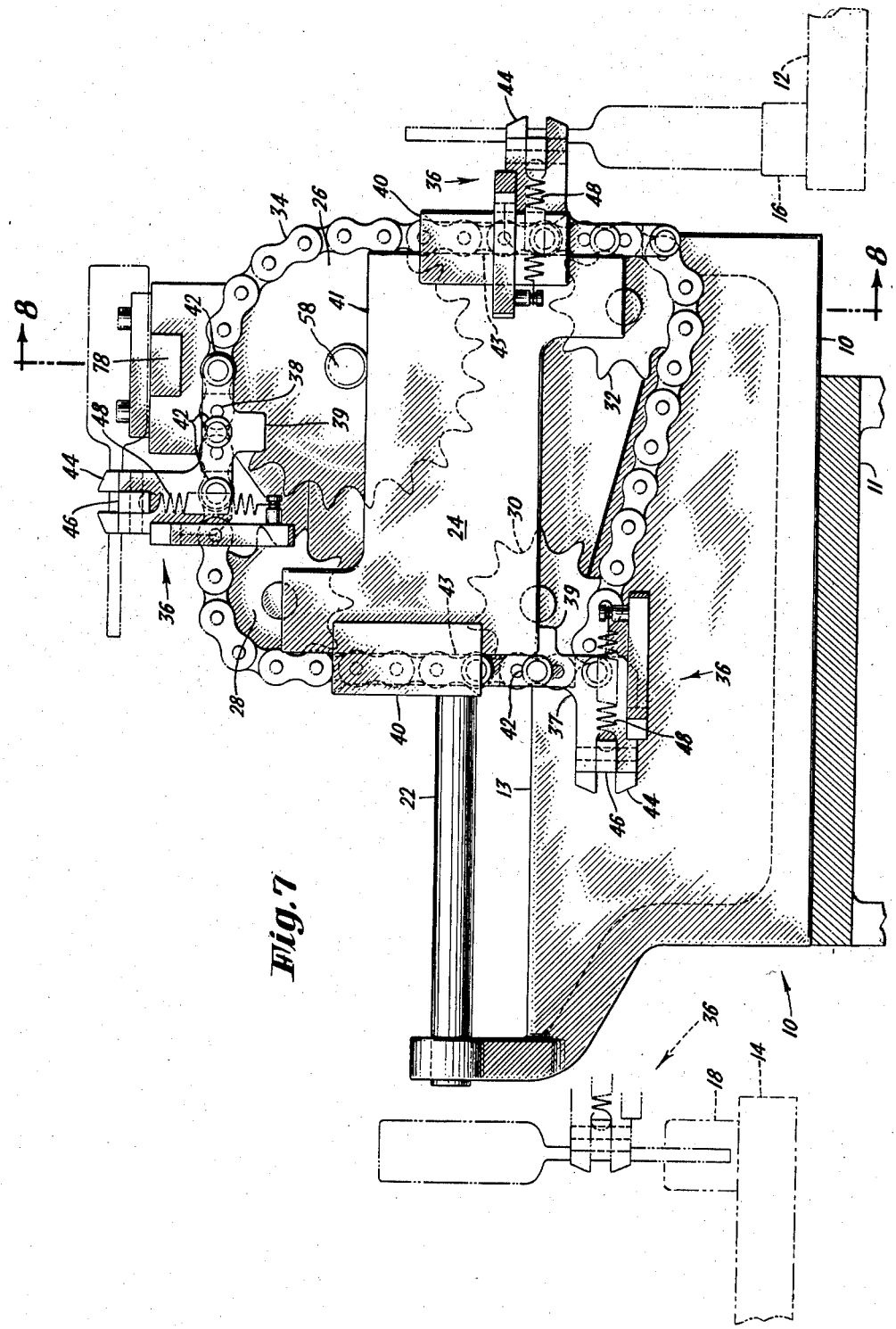
Fig. 7 is another view of the carriage and chain taken along the line 7—7 of Fig. 1.
Figure 8:
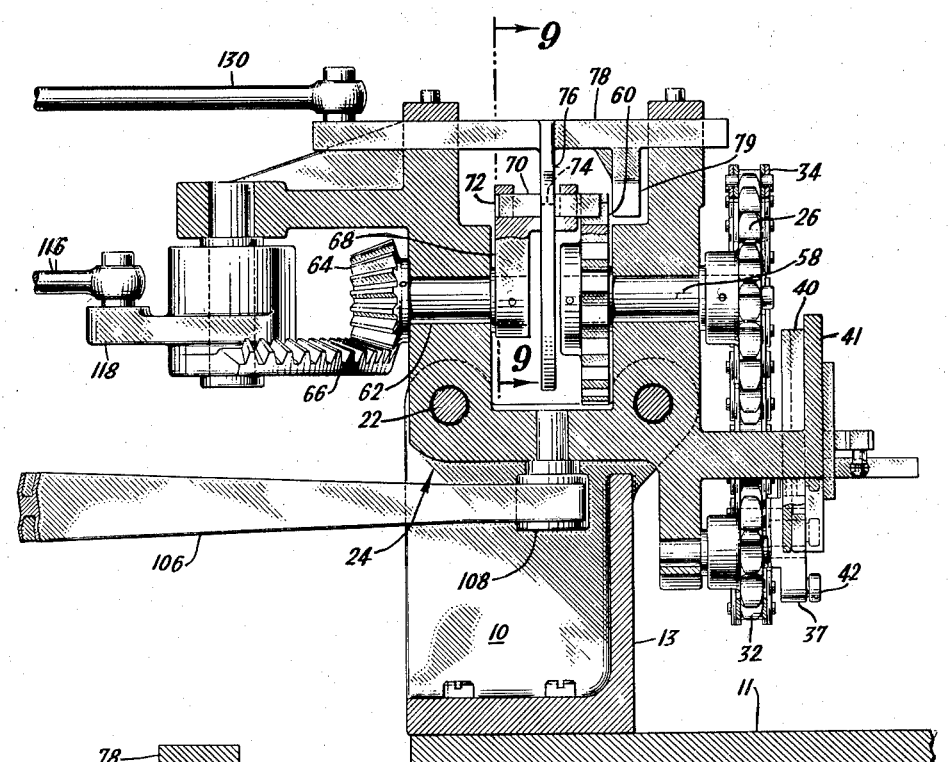
Fig. 8 is a vertical cross-section through the carriage on the line 8—8 of Fig. 7.
Figure 9:
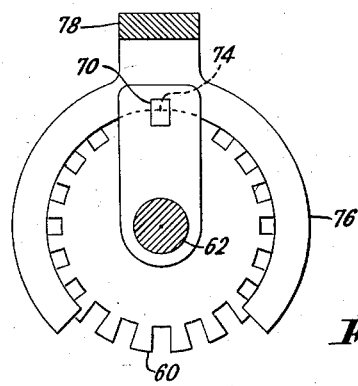
Fig. 9 is a section on the line 9—9 of Fig. 8.

Referring to the drawings in greater detail, at 10, see Figs. 1, 7, and 8, there is indicated a cradle with a single reinforcing vertical side wall 13, said cradle and wall being fixedly supported on a table 11, fixed with reference to a tube sealing mechanism fragmentarily shown at 12, Fig. 1, and a tube exhausting and further tube processing mechanism fragmentarily shown at 14. These mechanisms, by themselves, form no part of the invention and are therefore only shown in fragmental diagrammatic form. It is sufficient for the purposes of describing this invention to state that the sealing turret is provided with a circumferential array of regular spaced pedestals or sealing pegs 16 which support the tube components, with the stems down, as the pegs rotate and travel past sealing flames; the other turret is provided with a circumferential array of exhaust ports 18 into which the exhaust tubulations are inserted, and with the stems up, so that during the rotation of the second turret the tubes may be exhausted, the electrodes treated and the tube sealed off.

The two turrets are driven intermittently by a common drive mechanism, not shown. The transfer mechanism is also driven from the same drive mechanism whereby all parts are synchronized.

The cradle 10 carries two rails 22, 22 extending between and running from one turret to the other. Slidable on the rails is a carriage 24, this carriage mounting a large intermittently driven sprocket wheel 26 and three idler sprockets 28, 30, and 32. Trained about these sprocket elements in a substantially rectangularly orbit and in a vertical plane is a sprocket chain 34 carrying three equally spaced exhaust tube engaging clasps 36. When the carriage is to the right of the rails as illustrated in Figs. 1, 5, and 7, one of the clasps is operated to engage an exhaust tubulation of an assembled bulb and stem and is in position to lift the tube off from the peg. When the carriage is at the left of the rails, a clasp moves downwardly and thrusts the tubulation of a tube carried by that clasp into an exhaust port and then releases the tube. The chain, of course, moves intermittently with the movement of the sprocket wheel 26. Each of the clasps carried by the chain comprises a block 37, see Figs. 1 and 6, mounted on pins 38 of the chain and this block is guided for movement when moving along the vertical reaches of the chain by a tail piece 39 riding in guides 40 provided on a wall 41 forming part of the carriage and by rollers 42 on stub-shafts in the block 37, these rollers riding along edges 43 of the guides 40, as shown in Figs. 1, 7, and 8. The guiding means is provided to insure accuracy of alignment of parts to avoid breakage of the glass on removal of the tube from its peg or on insertion of the exhaust tubulation in the exhaust port. Fixedly mounted on each block 37 is a fixed jaw 44 and cooperating with each fixed jaw is a second jaw 46 pivoted to the first jaw and urged to closing position by a spring 48 anchored at one end to a pin 50 on an extension 52 from the fixed jaw and anchored at its other end to an intermediate portion of a tail 54 extending from the pivoted jaw. A stop 56, see Fig. 1, on the pivoted jaw engageable with the first jaw limits closing movement of the movable jaw. The tail portions of the movable jaws extend into the path of movement of operating mechanism which engages a movable jaw and opens a clasp at an appropriate time, as will be described.

The intermittently driven sprocket 26, see Figs. 7 and 8, in the preferred construction, has a number of links which is a multiple of three e. g., thirty-nine links and is mounted on a driven stub shaft 58 journalled in the carriage 24. Fixed on this stub shaft is a toothed driving and brake cog 60. Also journalled in the carriage and axially aligned with the stub shaft 58 is a driving stub shaft 62, driven by a pinion 64 secured thereto and by a sector gear 66 meshing with the pinion 64. Also secured to the stub shaft 62 is a L-shaped arm 68, slidably supporting a substantially rectangular key 70 for movement in a direction parallel with the axes of the stub shafts and movable into and out of the spaces between the teeth of the cog 60, the key fitting snugly between the teeth to avoid looseness of parts. The key, it will be noted, slides in complemental openings 72 in spaced apart projections on the arm 68. The key has a slot 74 which cooperates with an arcuate way 76, extending around the stub shafts with the axes of the stub shafts as the center of curvature of the way. The way itself is laterally shiftable, by being made fast or integral with a slide 78 shiftable parallel to the stub shafts. The slide 78 also carries a locking nose 79 snugly lockingly engaging the cog 60 just as the key 70 is shifted out of driving engagement with the cog, and releasing the cog just as the key 70 engages the cog. To assist in this section, the entering edges of the key and nose may be slightly tapered to facilitate entry of the parts into the cog. The locking nose is provided to prevent undesired shifting of the cog and chain relative to the remaining mechanism. Parts are so synchronized that when the gear sector 66 is being oscillated into the plane of the paper, Fig. 8, the slide 78 is in the position shown and rotation of stub shaft 62 will effect rotation of arm 68, key 70 and cog 60, thereby moving the cog thirteen toothed spaces and the chain through thirteen links or one-third of its length. Just prior to return oscillation of gear sector 66, the slide 78 is shifted to the left, removing the key 70 from the cog 60 and thrusting the locking nose 79 between the teeth of the cog, thereby holding the chain against movement. Then the arm 68 and key 70 are returned, in an idle stroke, back to original position, thirteen of the teeth back on the cog. During the working stroke of the sector 66, the clasps on the chain are effective to lift a tube off a sealing peg and transport the same one-third of the way around the orbit of the chain. On the next operative stroke of gear sector 66, the same tube is moved another third way round the orbit of the chain and is thrust, tubulation end down, into a port in the exhaust turret.

However, during the time that the chain is advancing one-third of its distance around its orbit, the carriage 24 is moved from the position shown in Fig. 7 to a position at the left end of the rails 22, the carriage starting its movement shortly after the chain has started moving to clear a tube off the sealing peg 16, and the carriage completing its movement shortly before the chain has stopped moving. While the carriage is stationary, final movement of the chain thrusts a previously chain transported tube into an exhaust port.

Means are provided to open the clasps at the proper times to grasp a tubulation prior to lift of a tube off its sealing peg and to release a tubulation after the tubulation has been thrust into its exhaust port. Consider the mechanism disclosed in Figs. 1 and 5. Fixed to the table 11 is a bridge 80. At one end of the bridge is pivoted a pivoted jaw actuator arm 82 provided with an anti-friction roller 83 and at the other end the bridge is provided with a second arm 84 carrying an anti-friction roller 85. These rollers are adapted to engage, in alternation, edges of the tails 54 of the movable jaws. When the carriage is to the right, as in Figs. 1 and 5, the right hand jaw will be operated on an oscillation of the arm 82. When the carriage is to the left, the left hand movable jaw will be operated on an oscillation of the arm 84. It will be noted that roller 83 is above its arm 82 while roller 85 is below its arm 84 to compensate for the differences in elevation of the jaws when at their tube removing and tube inserting positions. The arms 82 and 84 are interconnected by a long link 86 connected at one end to a plate 88 mounted on a shaft connected with arm 82 and at its other end to a crank arm 90 mounted on a shaft connected with the arm 84 so that the arms are pivoted for simultaneous movements in opposite directions. When the carriage 24 is to the right, the right hand jaw 46 will be operated clockwise by the arm 82, with the arm 84 executing an idle stroke. When the carriage is to the left, the left hand jaw 46 will be operated counter-clockwise by arm 84 while the right hand 82 is executing an idle stroke. Both arms are moved by a short link 92 pivoted at one end to plate 88 and at the other end to a long arm 94 secured to an oscillatable vertical shaft 96 on the lower end of which is fixed a cam follower arm 98 provided with a roller 100 engaging a cam surface 102 on a cam synchronized for movement with the turrets. A spring 104 stretched between the bridge 80 and an ear on long link 94 serves to maintain the cam follower 100 against its cam and to keep the arms 82 and 84 in their inoperative retracted positions. For each displacement of the carriage, whether to the right or left, there is an operation of the two arms 82 and 84 resulting in an opening and closing movement of one only of the movable jaws.

The shifting of the carriage is effected by means of a long crank arm 106, see Figs. 1, 2, 3, and 8, said arm having a forked end straddling an anti-friction roller 108 rotatably mounted on a pin fitted into the lower wall of the carriage 24. The arm 106 is fastened to the upper end of an oscillatable vertical shaft 110 journalled in a long bearing in a web-reinforced member 111 secured to the machine frame. On the lower end of the shaft is fixed a cam follower supporting arm 112, the cam follower being in the form of a roller 114, with the roller lying in the confines of a barrel cam 115, fast on a shaft 116, driven in synchronism with the turret indexing mechanism. Thus rotation of cam 115 produces reciprocatory movements of carriage 24.

The intermittent motion of the chain, as already explained, is obtained through oscillation of the gear sector 66. The gear sector is oscillated by means of a pitman rod 117 connected at one end with an arm 118 integral with the gear sector 66 and at its other end with an oscillatable bell crank lever having a drive arm 120 rotatable at its lower end on a horizontal pin 122 fixed in a bearing in the member 111, said bell crank lever also having a cam operated arm 124 oscillatable in a vertical plane and carrying at its free end a cam follower roller 126, cooperating with a cam 127 fast on the shaft 116.

The slide 78 is operated through a pitman 130 in turn driven by an arm 134 of a bell crank lever also pivotally mounted on pin 122, the other arm 136 of the lever being provided with a follower roller 138 cooperative with a cam 140, also fast on shaft 116. In Fig. 3 the arm 124 is broken away to show arm 136.

As a result of the construction described, a tube which has been partially processed on a turret is smoothly removed from the turret, is transported bodily to a second tube processing machine provided with a turret having ports, the tube is inverted during transportation and then inserted automatically into a port of the second turret, while all parts are moving in proper synchronization.

Having thus described the invention what is claimed as new is:

1. A transfer mechanism comprising a reciprocatable carriage, an endless carrier on said carriage movable in a plane and in a substantially rectangular path, equally spaced normally closed clasps on said carrier, means for moving said carriage and endless carrier and for opening said clasps, said clasp opening means being located along parallel reaches of the carrier.

2. A transfer mechanism comprising a reciprocatable carriage, an endless carrier on said carriage movable in a plane and in a substantially rectangular path, equally spaced normaly closed clasps on said carrier, means for reciprocating said carriage and intermittently driving said carrier, means located along parallel reaches of said carrier for opening said clasps, with said means opening one of said clasps during approach movement of said carriage toward one end of its travel and one of said clasps prior to receding movement of said carriage from the other end of its travel.

3. A transfer mechanism comprising a reciprocatable carriage and means for reciprocating the same, an endless conveyor on said carriage, equally spaced normally closed tube clasps mounted on said conveyor, means for intermittently moving said conveyor a distance equal to the equal spacing of said clasps, means for opening one only of said clasps at one position in the orbit of the conveyor when the carriage is at one end of its travel, and means for opening one only of said clasps at another position in the orbit of the carrier when the carriage is at the other end of said travel.

4. In combination, an article feeder, an article carry off device, and an article transfer mechanism therebetween, said article transfer mechanism comprising a carriage reciprocatable between said feeder and carry-off device, a conveyor on said carriage, a clasp on said conveyor, said feeder comprising article supports, said carriage and conveyor being movable to a position where the clasp is opposite a support, means operative to cause a clasp to grasp an article and withdraw the latter from its support when at said position, and means operative to release the clasp when the carriage and the conveyor is at a second position with a clasp held article engaged with the carry off device.

5. In combination, an article feeder, an article carry-off device, and an article transfer mechanism therebetween, said article transfer mechanism comprising a carriage reciprocatable between said feeder and carry-off device, a conveyor movable in a substantially rectangular path on said carriage, equally spaced clasps on said conveyor, said feeder comprising article supports, said carriage and conveyor being movable to a position where a clasp is opposite a support, means operative at one reach of the conveyor to cause a clasp to grasp an article and withdraw the latter from its support, when at said position, and means operative at a parallel reach of the conveyor to release the clasp when the carriage and the conveyor is at a second position with a clasp held article engaged with the carry off device.

6. In combination, an indexible turret, circumferentially spaced article supports on said turret, a second turret with circumferentially spaced article receivers, and an article transfer mechanism between the turrets, said article transfer mechanism comprising a carriage reciprocatable between said turrents, an endless conveyor on said carriage, a plurality of equally spaced clasps mounted on said conveyor, said carriage and conveyor being movable to a position where a clasp is opposite a support, means operative to cause a clasp to grasp an article and withdraw the latter from its support when at said position, means operative to advance the conveyor, and means operative to release the clasp when the carriage is at a second position and the conveyor has been advanced to a position where a clasp held article engages a receiver on said second turret.

7. In combination, an indexible turret, circumferentially spaced article supports on said turret, a second turret with circumferentially spaced article receivers, and an article transfer mechanism between the turrets, said article transfer mechanism comprising a carriage reciprocatable between said turrets, an endless conveyor travelling in a substantially rectangular path on said carriage, a plurality of equally spaced clasps mounted on said conveyor, said carriage and conveyor being movable to a position where a clasp is opposite a support, means operative at one reach of said conveyor to cause a clasp to grasp an article and withdraw the latter from its support when at said position, means operative to advance the conveyor, and means operative at a parallel reach of said conveyor to release the clasp when the carriage is at a second position and the conveyor has been advanced to a position where a clasp held article engages a receiver on said second turret.

8. In combination, an indexible turret, circumferentially spaced article supports on said turret, a second turret with circumferentially spaced article receivers, and an article transfer mechanism between the turrets, said article transfer mechanism comprising a carriage reciprocatable between said turrets, an endless conveyor on said carriage, a plurality of equally spaced clasps mounted on said conveyor, said carriage and conveyor being movable to a position where a clasp is opposite a support, means operative to cause a clasp to grasp an article and withdraw the latter from its support when at said position, means operative to advance the conveyor, and means operative to release the clasp when the carriage is at a second position and the conveyor has been advanced to a position where a clasp held article engages a receiver on said second turret, and means to intermittently advance said conveyor only during the motion of the carriage from the first to the second position.

9. A transfer mechanism comprising a reciprocatable carriage and means for reciprocating the same, an endless conveyor on said carriage, equally spaced normally closed tube clasps mounted on said conveyor, means for intermittently moving said conveyor a distance equal to the equal spacing of said clasps, means for opening one only of said clasps at one position in the orbit of the conveyor when the carriage is at one end of its travel, and means for opening one only of said clasps at another position in the orbit of the carrier when the carriage is at the other end of said travel, said means for moving said conveyor comprising a cog in driving relation to the conveyor, a key movable into and out of engagement with the cog, an oscillatable arm slidably retaining the key, a slot in the key, an arcuate way concentric with the axis of the oscillatable arm with the way projecting into the slot, and a slide for shifting the way laterally to move the key into and out of engagement with the cog.

10. A transfer mechanism comprising a reciprocatable carriage and means for reciprocating the same, an endless conveyor on said carriage, equally spaced normally closed tube clasps mounted on said conveyor, means for intermittently moving said conveyor a distance equal to the equal spacing of said clasps, means for opening one only of said clasps at one position in the orbit of the conveyor when the carriage is at one end of its travel, and means for opening one only of said clasps at another position in the orbit of the carrier when the carriage is at the other end of said travel, said means for moving said conveyor comprising a cog in driving relation to the conveyor, a key movable into and out of engagement with the cog, an oscillatable arm slidably retaining the key, a slot in the key, an arcuate way concentric with the axis of the oscillatable arm with the way projecting into the slot, a slide for shifting the way laterally to move the key into and out of engagement with the cog, and a locking nose movable with the slide and spaced from the end of the key to engage the cog when the key moves out of engagement with the cog and to become disengaged with the cog as the key engages the same.

References Cited in the file of this patent

UNITED STATES PATENTS

| | | |
|---|---|---|
| 1,411,172 | Kaye | Mar. 28, 1922 |
| 1,766,574 | Westin | June 24, 1930 |
| 1,835,579 | Westin | Dec. 8, 1931 |
| 1,839,438 | Prussing | Jan. 5, 1932 |
| 2,683,538 | Kingston et al. | July 13, 1954 |